United States Patent [19]

Garrido et al.

[11] Patent Number: 4,924,721

[45] Date of Patent: May 15, 1990

[54] WORM GEAR ELEVATOR DRIVE AND ASSEMBLY METHOD

[75] Inventors: Alfonso Garrido, Madrid, Spain; Fernando Rico, Rueil Malmaison, France

[73] Assignee: Otis Elevator Company, Farmington, Conn.

[21] Appl. No.: 115,326

[22] Filed: Nov. 2, 1987

[30] Foreign Application Priority Data

Nov. 7, 1986 [ES] Spain .................................... 8602958

[51] Int. Cl.[5] .......................... F16H 57/02; F16H 1/16

[52] U.S. Cl. ..................................... 74/425; 74/606 R

[58] Field of Search .................... 74/89.14, 425, 606 R

[56] References Cited

U.S. PATENT DOCUMENTS

| | | | |
|---|---|---|---|
| 2,734,393 | 2/1956 | Wenberger | 74/425 |
| 2,763,471 | 9/1956 | Richterkessing | 74/425 X |
| 2,868,031 | 1/1959 | Schumb | 74/606 X |
| 3,715,932 | 2/1973 | Sharp | 74/425 |
| 4,020,715 | 5/1977 | Sollars | 74/425 X |

FOREIGN PATENT DOCUMENTS

| | | | |
|---|---|---|---|
| 683424 | 11/1952 | United Kingdom | 74/425 |

*Primary Examiner*—Allan D. Herrmann

*Attorney, Agent, or Firm*—William W. Jones

[57] ABSTRACT

An elevator drive has an electric motor 12 which drives a worm 30 that drives a gear 20,28 on a shaft 22, at right angles to the worm 30. The output shaft is in the horizontal plane, and an elevator rope sheave 10 is attached to this shaft 22. The shaft 22 is mounted on two bearings 32,36, at opposite ends of a single piece case 14. The drive is assembled by first inserting the gear 20,28 through the side of the case 14, then inserting the shaft 22 through one end of the case through the gear 20,28 and into the bearing 36. Then a thrust plate 40 is tightened down on the end of the shaft 22 to hold the shaft in place on the bearing's inner race and also thrust the gear 20,28 onto the shaft 22. The worm 30 is then inserted through the top of the case 14. Both shaft support bearings 32,36 are machined on the same axis.

7 Claims, 3 Drawing Sheets

WORM GEAR ELEVATOR DRIVE AND ASSEMBLY METHOD

DESCRIPTION

1. Technical Field

This invention relates to elevator drive motors, in particular, geared elevator drive motors and, specifically, traction elevators employing elevator drive motors that use a worm gear.

2. Background Art

Geared elevator drives are very common. With few, if any, exceptions, geared elevator drives use a worm gear that engages a gear wheel that is attached to a shaft to which the elevator sheave is attached. The worm gear or worm as it is often called is rotated by an AC electrical motor, usually single or two speed, but, in some more recent systems, variable frequency AC to offer continuously variable motor speed control. The sheave, it is commonly known, engages the elevator ropes and usually supports the elevator car and counterweight, a considerable shaft load. In this "traction" elevator system, the traction between the rotating sheave and the rope propels the car.

Manufacture and assembly of geared elevator drives is notable in that it is expensive, complicated, and not always done in a way that maximizes longevity of the shaft bearings. Construction techniques have focused ostensibly on simplifying the insertion of the shaft and the wheel gear as a single subassembly in the motor housing or case, an objective that has led to the uniform use of two-piece gear housings or cases. Typically, the shaft subassembly with the bearings on the shaft is inserted into one gear case half. Semicircular bearing seats are milled into each half; these should be perfectly aligned with the shaft axis and should be perfectly circular because, when the two halves are joined, they form the bearing bore that supports each of the shaft bearings, of which there are two usually, one, just next to the sheave, the other, at the opposite end of the shaft. A seal is placed on the bottom of the case, and the two halves are bolted together. The two halves are separated to service the gear wheel and the worm. The vertical load on the shaft, which may be substantial, the combined weight of the cab and counterweight and ropes, exerts forces on the case that tends to distort the alignment of the two case halves. In reality, the stresses on the case halves or sections, is more complex than that because the load is entirely on one side of the shaft in all but a few geared traction elevators. The effect is that it is difficult to maintain precise bearing alignment over the life of the drive, which is typically many years, and the bearings may wear prematurely, creating annoying mechanical noise in the drive. Sometimes the stresses cause leaks in the case seal, allowing gear oil to escape.

DISCLOSURE OF INVENTION

An object of the present invention is to provide a far more reliable, durable type of geared elevator drive.

According to the present invention, the gear case is made of a single piece. An access port is provided on the side of the case to insert the gear wheel. The bearing bore or holes for the shaft ball bearings are drilled simultaneously, ensuring that the shaft bearings, when inserted, are coaxial.

According to the invention, the gear wheel is placed inside the case and then one end of the shaft inserted through one bearing hole towards the opposite bearing hole. The gear wheel is placed on the shaft. A ball bearing is inserted in the bore furthest from the shaft end that supports the sheave. A fitting on the end of the shaft is tightened to push the gear wheel onto the shaft by pushing the inner race of the bearing towards the gear wheel. The outer race of this bearing is pushed against a seat in the bearing bore by tightening a case cap that covers the bearing and the end of the shaft. The worm engages the gear wheel and is rotated to thread it down into a thrust bearing on the bottom of the case. A ball or roller bearing on the worm is held in place by a retainer or collar that is tightened (bolted) to the case from the top of the case with the motor removed.

Among the features of the present invention is that it allows for a very rapid assembly and disassembly of the motor; the bearings are optimally aligned and the alignment will not change; and the only gasket is for the access port, which does not sustain any loading.

BEST MODE FOR CARRYING OUT THE INVENTION

Figure 1:
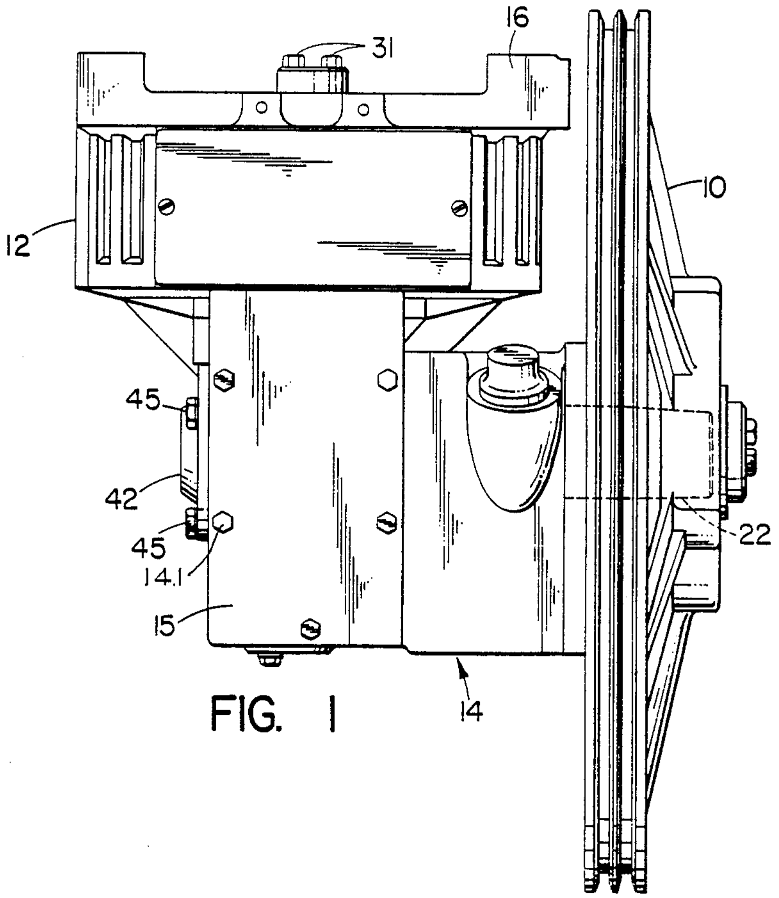
FIG. 1 is an elevational view of a worm gear elevator drive of the "vertical type", the worm gear is vertical and the motor is on the top of the gear housing or case.

As stated previously, FIG. 1 shows a "vertical" worm gear elevator drive motor. This drives contains a sheave 10 which is rotated by a motor 12 through a gear assembly (not visible) within a gear case 14. On the top of the motor 12 is a drum brake 16, simplistically shown being that it is commonly used in elevators. The operation of the brake is not germane to the invention; still it may be helpful to appreciate that a typical brake would have a drum that is bolted or otherwise attached to the motor shaft. The brake is operated when an elevator car is at a floor. Attached by a plurality of bolts to the case, a cover plate 16 closes access to the interior of the case. Assembly of the interior gear case components is conveniently made through the access provided when the plate is removed. Not shown, there is a gasket between the plate and the case.

Figure 2:
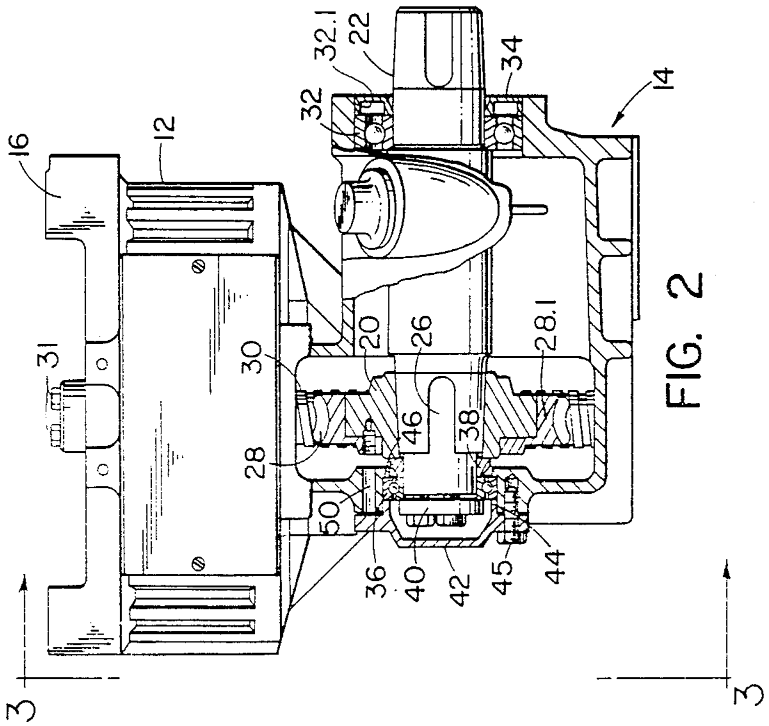
FIG. 2 is a sectional view of part of the gear case as seen from the same direction as in FIG. 1; it exposes the gear wheel, shaft, shaft bearing components and other parts inside the case.
Figure 4:
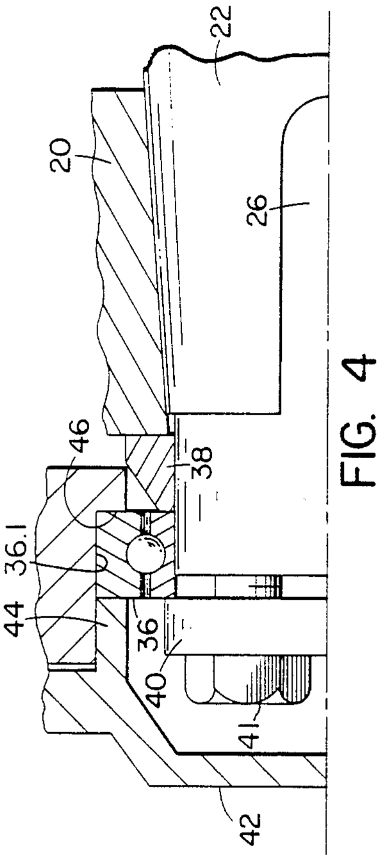

The sheave has been deleted in FIG. 2, which shows the internal components within the case 14, among them a circular gear wheel 20. Several features need to be observed. The shaft 22 is tapered and contains a key 26. The gear wheel, of course, fits tightly onto the taper and has a slot to receive the key. As in many drives, the gear teeth 28 are attached to the outside of the gear wheel, which acts more like a hub on which a rim, containing the teeth, is attached. These teeth are engaged by a worm 30, which is also visible in FIG. 3. The worm 30 extends upward partially through the motor. By means of a plurality of bolts 31 that extend down through the brake, the motor shaft and the brake and the worm are mechanically connected together.

At the "sheave end" of the shaft 22, there is a ball bearing 32 that is held in place by a retainer ring 34. At the opposite end of the shaft, there is also a ball bearing 36. The bore holes for each of these ball bearings are on the same axis, that is, they are coaxial, having been machined by rotating the case or drilling the holes on a common axis.

Special attention should be given to the way in which the bearing 36 is installed in the case and also to its relationship to the gear wheel. The way it is installed makes it possible to "hand assemble" the wheel gear on the shaft within the case; final assembly is achieved by positioning and adjusting externally accessible components. The size of the access hole into the case is minimized as access for tools is not required. Specifically, the bearing 36 is lightly pushed into the bore around the shaft, but between the bearing 36 and the gear wheel 20 is a thrust ring 38. The inner race of the bearing 36 is pushed against the thrust ring 38 as a thrust plate 40 is "tightened down" onto the end of the shaft. This pushes the thrust ring against the gear wheel, forcing the gear wheel tightly on the tapered portion of the shaft. The outer race 36.1 of the bearing 36 is held in place by a cover plate 42, and it contains an inner flange 44. That flange fits snugly in the bearing bore or hole, and pushes the outer race 36.1 into its seat when the cover plate is tightened down with the bolts 45.

The gear teeth 28 are held on the gear wheel 20 by means of bolts. These bolts are not shown, but it should be understood that this type of attachment is common. However, access to the bolts is conveniently provided by removing the cover plate 42, exposing the holes 50, through which the bolts can be reached.

Assembly of the motor and, for that matter, disassembly and repair is especially convenient. Using the single piece case 14, that is, with the bore holes for the bearings coaxially and simultaneously machined, the gear 20 with the gear teeth 28 thereon is first inserted into the side of the machine through the space provided by the removed plate 15. Holding the gear wheel 20 in one hand, the installer then inserts the shaft 22 through the right side of the case, directing the tapered end and the keyhole through the interior of the gear wheel 20. Then the spacer ring 38 is slid over the end of the shaft, passing through the interior of the bore hole. It is placed lightly against the gear wheel 20. The bearing 36 is then placed over the end of the shaft within the bore hole, an action which, as stated before, forces the inner race against the retainer ring and thereby holds the gear wheel 20 securely in place on the shaft.

Figure 3:
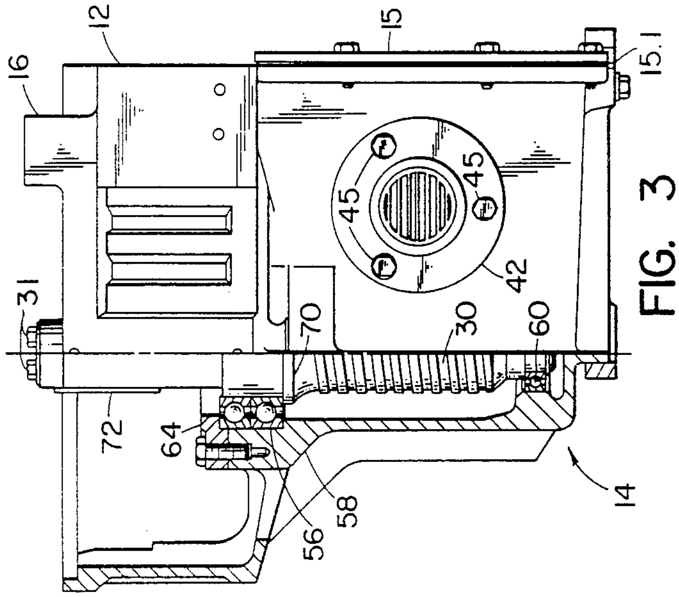
FIG. 3 is a partial sectional view, as seen from the direction 3—3 in FIG. 1, and exposes the worm and its bearings and bearing retainer.

The worm is then separately installed from the top of the case 14 by rotating it so that it is "threaded down" by the wheel gear that it engages. As FIG. 3 shows, the worm is supported on two roller or ball bearings 56, 60. The bearing 56 rests in a seat 58 in the top of the case. The lower end of the worm 30 contains a narrow shaft area that fits into the bearing 60, a thrust roller or ball bearing. A retainer ring 64 is fastened in place onto the case, securing the bearing in place by pressing the outer race of the bearing into the seat 58. The worm contains a collar 70 which butts up against the inner race of the bearing 56. The worm 30 extends all the way up through the case. The motor, with the brake attached to the motor shaft, is installed on the case, and the motor shaft is attached to the worm. The worm 30 contains a key 72. The motor 14 drive shaft, which is not visible in the drawing, is hollow or tubular, a typical configuration, and the key registers with a keyway inside the shaft.

The assembly is finally completed when the motor is then bolted in place on top of the motor and the motor and brake shaft is secured through bolts 31 to the worm 30. Then the cover plate 15 and the gasket 15.1 between it and the case are then installed using bolts 14.1.

The foregoing is a description of the best mode for carrying out the invention, but it will be obvious to one skilled in the art that modifications and variations therein may be made in whole or in part without departing from the true scope and spirit of the invention.

We claim:

1. An elevator drive comprising an electric motor, a worm that is rotated by the motor to rotate a drive gear 90° thereto, a shaft attached to the drive gear, characterized in that:

the shaft is supported by bearings on a common axis placed in a single piece case that contains an access hole for inserting the drive gear;

a removable thrust plate on one end of the shaft, accessible from outside the case, and attached to the shaft by one or more bolts;

a bearing with an inner race that is forced towards the drive gear by the thrust plate which forces the drive gear on the shaft.

2. An elevator drive according to claim 1, characterized in that:

an end cap is bolted over the thrust plate and contains an inwardly extending flange that forces the outer race of the bearing against a seat.

3. An elevator drive according to claim 1, characterized in that:

a thrust ring is located around the shaft between the inner race and the drive gear by which the inner race forces the drive gear on the shaft.

4. An elevator according to claims 1, 2 or 3, characterized in that the worm is supported by a thrust bearing in the bottom of the case and a roller or ball bearing at a position above the drive gear, the roller bearing being held in the case by a retainer that is bolted into the case from the top of the case.

5. A method of assembling an elevator drive comprising the steps:

placing opposed coaxial bearing bores in a single piece gear case;

providing an access port to the interior of the case;

placing a circular drive gear in the interior of the case through the port;

passing a shaft through one bore in the case, through a shaft receiving hole in the gear, and into the other bearing bore;

placing a ball or roller bearing in said other bore with its inner race on the shaft;

installing a thrust plate on one end of the shaft that engages the inner race of said bearing;

tightening the thrust plate on the shaft to apply force through the inner race to force the drive gear on the shaft;

placing a cap on the case to cover said one end of the shaft, said cap containing a flange that forces the outer race of the bearing against a bearing seat in the case;

placing a worm in the case at 90° to the drive gear and engaging the gear;

placing an electric motor on the case over the worm and attaching the motor and the worm;

installing a cover plate over the access port.

6. A method according to claim 5, characterized by placing a thrust ring around the shaft between the inner race and the drive gear.

7. A method according to claim 5 or 6 characterized in that the worm is threaded down into the case, into a thrust bearing at the bottom of the case, by rotating it as it engages the drive gear and by tightening a retainer ring onto the case at a position above the drive gear, from the top of the case, to retain a bearing on the worm.

* * * * *